(12) United States Patent
Moon et al.

(10) Patent No.: US 11,262,051 B2
(45) Date of Patent: Mar. 1, 2022

(54) FLAT LAMP WITH LIGHT GUIDE PLATE AND METHOD FOR MOUNTING THE SAME

(71) Applicant: Sang Pil Moon, Seoul (KR)

(72) Inventors: Dai Sung Moon, Seoul (KR); Sang Pil Moon, Seoul (KR)

(73) Assignee: Sang Pil Moon, Seoul (KR)

( * ) Notice: Subject to any disclaimer, the term of this patent is extended or adjusted under 35 U.S.C. 154(b) by 167 days.

(21) Appl. No.: 16/611,889

(22) PCT Filed: May 12, 2017

(86) PCT No.: PCT/CN2017/084204
§ 371 (c)(1),
(2) Date: Nov. 8, 2019

(87) PCT Pub. No.: WO2018/205280
PCT Pub. Date: Nov. 15, 2018

(65) Prior Publication Data
US 2021/0140612 A1    May 13, 2021

(51) Int. Cl.
*F21V 8/00* (2006.01)
*F21V 21/03* (2006.01)
*F21V 17/16* (2006.01)

(52) U.S. Cl.
CPC ............ *F21V 21/03* (2013.01); *F21V 17/16* (2013.01); *G02B 6/0073* (2013.01)

(58) Field of Classification Search
CPC ...... F21V 21/036; F21V 17/16; G02B 6/0073
See application file for complete search history.

(56) References Cited

FOREIGN PATENT DOCUMENTS

| CN | 204141373 U | 2/2015 | |
|---|---|---|---|
| CN | 204268139 U | 4/2015 | |
| CN | 105650549 A | 6/2016 | |
| WO | WO-2016169097 A1 * | 10/2016 | ............ F21V 23/06 |

OTHER PUBLICATIONS

International Search Report of PCT Patent Application No. PCT/CN2017/084204 dated Feb. 14, 2018.

* cited by examiner

*Primary Examiner* — Joseph L Williams

(57) ABSTRACT

A flat lamp with a light guide plate comprises a lamp body, an LED plate arranged on a side wall of the lamp body, an upper support plate snap-fitted and connected to an opening end of the lamp body, and a fixing assembly arranged over a surface of the upper support plate and connected with the upper support plate. A method for mounting the flat lamp comprises steps of screwing screws into arc grooves of the cover plate of the fixing assembly and into screw holes provided at ends of the support plate members and fixing the fixing assembly on a roof; and moving the support plate members (41) to allow them to slide into the V-shaped bent portions of the connecting components and then continue sliding until being restrained by the bent plate at an end.

7 Claims, 1 Drawing Sheet

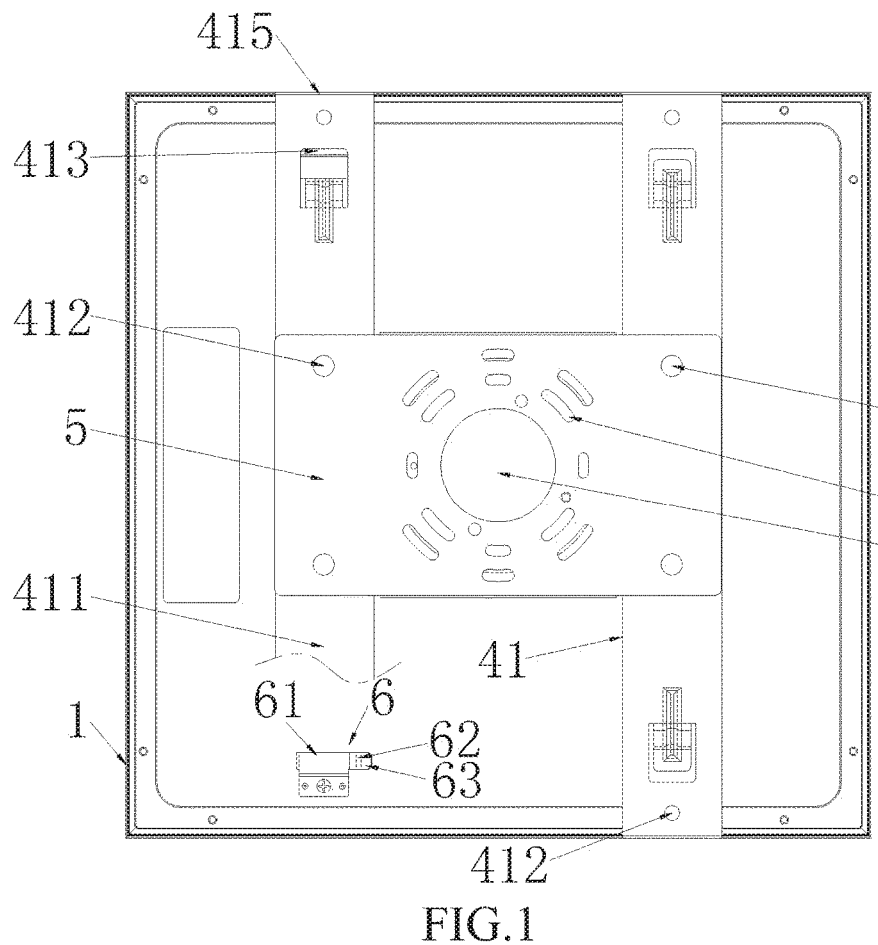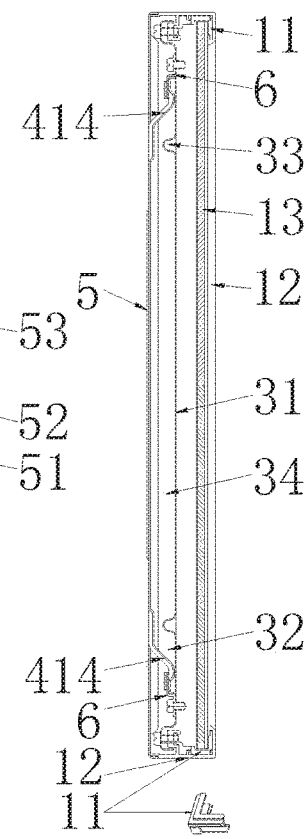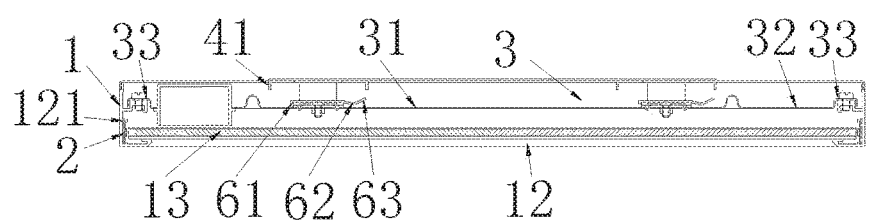

FLAT LAMP WITH LIGHT GUIDE PLATE AND METHOD FOR MOUNTING THE SAME

FIELD OF THE INVENTION

The present invention relates to a flat lamp with a light guide plate and a method for mounting the same.

BACKGROUND OF THE INVENTION

Flat lamps with the light guide plate that are available on the market usually have a large light emitting surface in a middle portion and a small body frame for defining the lamp. It is not easy for the user to mount such flat lamps on the roof.

SUMMARY OF THE INVENTION

Technical Problem

One object of the present invention is to provide a flat lamp which comprises a light guide plate and can be easily mounted on the roof. Another object of the present invention is to provide a method for mounting the flat lamp which can be easily mounted on the roof.

Technical Solution

The present invention provides a technical solution of a flat lamp with a light guide plate, characterized in that the flat lamp comprises a lamp body, an LED plate arranged on a side wall of the lamp body, an upper support plate snap-fitted and connected to an opening end of the lamp body, and a fixing assembly arranged over a surface of the upper support plate and connected with the upper support plate.

Preferably, the lamp body may comprise an L-shaped corner connector, a frame connected with the corner connector, a U-shaped groove provided by the frame to catch the LED plate, and a light guide plate arranged at a bottom end of the frame.

Preferably, the upper support plate may comprise a plate body, a large groove defined by a recessed surface of the plate body, a small groove located in the large groove and defined by protrusions respectively located outward than a pair of elongated plates and inward than a pair of square holes, and a center though hole provided at a position that coincides with the large groove.

Preferably, the fixing assembly may comprise a pair of support plate members arranged in parallel and a cover plate arranged on top surfaces of the two support plate members.

Preferably, the support plate member may comprise an elongated plate, screw holes provided in a middle portion of the elongated plate and corresponding with screw holes of the cover plate, square holes symmetrically arranged at two ends of the elongated plate, tongue plates extend into the square holes along the edges of the square holes to form Z-shaped steps respectively, and bent plates defined by two vertically bent end portions of the elongated plates.

Preferably, the tongue plates which form Z-shaped steps in the square holes are respectively connected with a connecting component, the connecting component is vertically bent in a reverse direction at a middle portion to form a bent plate, and one end portion of the bent plate extends outward to form a V-shaped bent portion and then a lifted end.

Preferably, the cover plate may comprise a center though hole provided on a surface of the plate, a plurality of annular grooves provided around the center though hole and having different radii, and screw holes provided outward than the annular grooves. The annular grooves comprise a plurality of arc grooves which are not in communication with each other.

The present invention provides a technical solution of a method for mounting the flat lamp with a light guide plate, characterized in that the method comprises steps as follows.

1. Screwing a screw into an arc groove of the cover plate of the fixing assembly and into a screw hole provided at an end of the support plate member, and fixing the fixing assembly on a roof;
2. Moving the support plate member to allow it to slide into the V groove of the support plate assembly and then continue sliding until being restrained by the bent plate at an end.

Advantages

1. The lamp is easy to mount.
2. The lamp has a thin structure, large luminous area and narrow frame. It may merge into the roof without ruining the style of the roof and can be widely used.
3. The lamp has elegant appearance and no light leakage occurs at four corners when the lamp is turned on.

BRIEF DESCRIPTION OF THE DRAWINGS

FIG. 1 is a schematic drawing of a flat lamp of the present invention;

FIG. 2 is a side view of the device shown in FIG. 1.

FIG. 3 is another side view of the device shown in FIG. 1.

Reference numerals of main components are as follows.

TABLE 1

| | | | |
|---|---|---|---|
| 1. lamp body | 11. corner connectors | 12. frame | 121. U-shaped grooves |
| 13. light guide plate | 2. LED plate | 3. upper support plate | 31. plate body |
| 32. large groove | 33. protrusions | 34. small groove | 4. fixing assembly |
| 41. support plate members | 411. elongated plates | 412. screw holes | 413. square holes |
| 414. tongue plates | 415. bent plates | 5. cover plate | 51. center though hole |
| 52. arc grooves | 53. screw holes | 6. connecting components | 61. bent plates |
| 62. V-shaped bent portions | 63. lifted end | | |

DETAILED DESCRIPTION OF ILLUSTRATED EMBODIMENTS

The present invention will be further explained below in detail in conjunction with drawings.

Referring to FIG. 1, a flat lamp with a light guide plate comprises a lamp body 1, an LED plate 2 arranged on a side wall of the lamp body 1, an upper support plate 3 snap-fitted and connected to an opening end of the lamp body 1, and a fixing assembly 4 arranged over the surface of the upper support plate 3 and connected with the upper support plate 3.

Referring to FIGS. 2 and , the lamp body 1 comprises L-shaped corner connectors 11, a frame 12 connected with the corner connectors 11, U-shaped grooves 121 provided by the frame 12 to catch the LED plate 2, and a light guide plate 13 arranged at the bottom end of Referring to FIG. 2, the upper support plate 3 comprises a plate body 31, a large groove 32 defined by recessed surface of the plate body 31, a small groove 34 located in the large groove 32 and defined by protrusions 33 respectively located outward than a pair of elongated plates 411 and inward than a pair of square holes 413, and a center though hole (not shown in the drawings) provided at a position that coincides with the large groove 32.

Referring to FIGS. 1, 2 and 3, the fixing assembly 4 comprises a pair of support plate members 41 arranged in parallel and a cover plate 5 arranged on the top surfaces of the two support plate members 41.

In the embodiment, the support plate members 41 comprise elongated plates 411, screw holes 412 provided in the middle portions of elongated plates 411 and corresponding with the screw holes of the cover plate, square holes 413 symmetrically arranged at respective two ends of the elongated plates 411, tongue plates 414 extend into the square holes 413 along the edges of the square holes 413 to form Z-shaped steps respectively, and bent plates 415 defined by two vertically bent end portions of the elongated plates 411. The tongue plates 414 which are connected with connecting components 6.

Referring to FIG. 1, the cover plate 5 comprises a center though hole 51 provided on the plate surface, a plurality of annular grooves provided around the center though hole 51 and having different radii, and screw holes 53 provided outward than the annular grooves. The annular grooves comprise a plurality of arc grooves 52 which are not in communication with each other.

Referring to FIGS. 2 and 3, each connecting component 6 is vertically bent in a reverse direction at the middle portion to form a bent plate 61, and one end portion of the bent plate 61 extends outward to form a V-shaped bent portion 62 and then a lifted end 63.

Referring to FIGS. 1, 2 and 3, a method for mounting the flat lamp with a light guide plate comprises steps as follows.

1. Screwing screws into arc grooves 52 of the cover plate of the fixing assembly 4 and into screw holes 412 provided at ends of the support plate members 41, and fixing the fixing assembly on the roof;

2. Moving the support members 41 to allow them to slide into the V grooves 63 of the support plate assembly and then continue sliding until being restrained by the bent plate 62 at an end.

All the above are merely preferred embodiments of the present invention. The present invention is intended to cover equivalent arrangements and modifications included within the scope of the present invention.

The invention claimed is:

1. A flat lamp with a light guide plate, characterized in that, the flat lamp comprises a lamp body, an LED plate arranged on a side wall of the lamp body, an upper support plate snap-fitted and connected to an opening end of the lamp body, and a fixing assembly arranged over a surface of the upper support plate and connected with the upper support plate, wherein the fixing assembly comprises a pair of support plate members arranged in parallel and a cover plate arranged on top surfaces of the two support plate members.

2. The flat lamp with the light guide plate according to claim 1, characterized in that, the lamp body comprises an L-shaped corner connector, a frame connected with the corner connector, a U-shaped groove provided by the frame to catch the LED plate, and the light guide plate arranged at a bottom end of the frame.

3. The flat lamp with the light guide plate according to claim 1, characterized in that, the upper support plate comprises a plate body, a large groove defined by a recessed surface of the plate body, a small groove located in the large groove and defined by protrusions located outward than a pair of elongated plates and inward than a pair of square holes, and a center though hole provided at a position that coincides with the large groove.

4. The flat lamp with the light guide plate according to claim 1, characterized in that, the support plate member comprises an elongated plate, screw holes provided in a middle portion of the elongated plate and corresponding with screw holes of the cover plate, square holes symmetrically arranged at two ends of the elongated plate, tongue plates extend into the square holes along edges of the square holes to form Z-shaped steps respectively, and bent plates defined by two vertically-bent end portions of the elongated plates.

5. The flat lamp with the light guide plate according to claim 4, characterized in that, the tongue plates which form Z-shaped steps in the square holes are respectively connected with a connecting component, the connecting component is vertically bent in a reverse direction at a middle portion to form a bent plate, and one end portion of the bent plate extends outward to form a V-shaped bent portion and then a lifted end.

6. The flat lamp with the light guide plate according to claim 1, characterized in that, the cover plate comprises a center though hole provided on a surface of the plate, a plurality of annular grooves provided around the center though hole and having different radii, and screw holes provided outward than the annular grooves, and the annular grooves comprise a plurality of arc grooves which are not in communication with each other.

7. A method for mounting a flat lamp with a light guide plate according to claim 1, characterized in that, the method comprises following steps:

i. screwing a screw into an arc groove of a cover plate of a fixing assembly and into a screw hole provided at an end of a support plate member, and fixing the fixing assembly on a roof;

ii. moving a support plate member to allow it to slide into a V groove of a support plate assembly and then continue sliding until being restrained by a bent plate at an end.

\* \* \* \* \*